Patented Oct. 28, 1947

2,429,664

UNITED STATES PATENT OFFICE 2,429,664

CHEWING GUM COMPOSITIONS

Harry Bennett, New York, N. Y.

No Drawing. Application August 8, 1945,
Serial No. 609,725

8 Claims. (Cl. 99—135)

1

This invention relates to improvements in chewing gum and in particular is directed to improvements therein so that the chewing gum will not adhere to dentures and fillings.

It is known that chewing gums have marked tendencies to stick tenaciously to acrylic and other plastic dentures as well as to fillings in teeth. In efforts to reduce this sticking action, chewing gums have been compounded in which well known detackifiers such as paraffin wax, metallic soaps, carnauba wax, oil and other materials have been relied upon. However, chewing gums prepared from compositions embodying the aforementioned detackifiers have not proved to be satisfactory as these chewing gums still possess the objectionable adhering characteristics.

I have found that marked improvements in the quality of chewing gum may be produced so that persons wearing plastic or other dentures, or whose teeth contain fillings, can chew the gum without discomfort.

This improvement is achieved by incorporating water insoluble amides and polyamides of fatty acids with the gum base. These effective results may be attained by incorporating from about 2 per cent up to about 10 per cent of the amides (based on the total weight of the gum). The products so produced do not adhere to plastic dentures or fillings in teeth and possess excellent qualities.

Among the amides which have been found useful for imparting the aforesaid detackifying characteristics to chewing gums are: stearamide, monoethanol amides of coconut oil fatty acids, hydroxy stearamide, and the like.

Among the polyamides which have been found efficacious in eliminating the undesirable sticking characteristics of chewing gum are: dipalmitamide, dicetylacetamide, trilauramide, pentaoleylamide.

Accordingly, it is an object of this invention to provide a chewing gum which will not occasion discomfort during the chewing operation.

The foregoing and other objects of the invention may be attained by the compounding of chewing gums prepared in accordance with the following illustrative examples:

*Example I*

97 pounds of commercial gum base is placed on a heated mill and to it there is gradually added 3 pounds of Acrawax C (Glyco Products Co., Inc., Brooklyn, New York). The milling and heating is continued until the product is uniform. To this milled product there are then added flavoring

2 materials, sugar and other ingredients customarily used for compounding chewing gums. The final product may then be cut to size, wrapped and packaged in accordance with conventional methods.

The Acrawax C used in this example is described by the manufacturer thereof as a substituted polyamide of stearic acid of the following specifications:

Color and form: Hard tan wax
Melting point: 137–139° C.
Flash point: 285° C. (open cup)
Sp. gr. (25° C.)—.0975
Oxidation potential: 400–500 mv.
Dielectric resistance: 428 v./mil.

Acrawax C has been found to be a particularly efficacious agent in combination with a gum base for producing a chewing gum of minimal tackiness. Tests have shown that Acrawax C is non-toxic. Furthermore by reason of its insolubility in water it does not dissolve out while the gum is being chewed.

Additionally, its high melting point prevents it from melting in the mouth, and this high melting point characteristic is especially of value in preserving the proper consistency of the gum when it is exposed to sunlight during the course of display or in storage at tropical temperatures.

*Example II*

To 96 pounds of a commercial gum base there may be added 4 pounds of stearamide, the latter being incorporated in accordance with the method described in the preparation of the product of Example I.

*Example III*

To 95 pounds of a commercial gum base there may be incorporated 5 pounds of trilauramide, the polyamide being combined with the gum base in accordance with the methods described in the preparation of the product of Example I.

It has been found that chewing gums prepared in accordance with this invention possess a marked freedom from tackiness so that they do not adhere to plastic dentures nor to the fillings in teeth.

It will be understood that various modifications in the compounding of the chewing gum may be made without departing from the principles of the invention, the primary consideration being that the amides or polyamides, used for imparting the desired detackifying characteristics, shall be thoroughly and uniformly incorporated into the ultimate product.

The amides or polyamides used for imparting detackifying characteristics to chewing gums are those which are water insoluble and have at least one fatty acid residue of at least 8 carbon atoms in size.

Having thus described my invention, I claim:

1. An improved chewing gum comprising in combination: a chewing gum base and an amide of a fatty acid having at least 8 carbon atoms.

2. An improved chewing gum comprising in combination: a chewing gum base; and an amide of higher fatty acid having at least 8 carbon atoms, the amide being present in an amount of not more than 10 per cent of the gum.

3. An improved chewing gum comprising in combination: a chewing gum base; and a substituted polyamide of stearic acid.

4. An improved chewing gum comprising in combination: a chewing gum base; and a substituted polyamide of stearic acid, the polyamide being present in an amount of not more than 10 per cent of the gum.

5. An improved chewing gum comprising in combination: a chewing gum base and a stearamide.

6. An improved chewing gum comprising in combination: a chewing gum base and a trilauramide.

7. An improved chewing gum in accordance with claim 2 wherein the amide is stearamide.

8. An improved chewing gum in accordance with claim 2 wherein the amide is trilauramide.

HARRY BENNETT.

REFERENCES CITED

The following references are of record in the file of this patent:

UNITED STATES PATENTS

| Number | Name | Date |
|---|---|---|
| 2,366,128 | Root | Dec. 26, 1944 |
| 2,368,208 | Epstein et al. | Jan. 30, 1945 |